United States Patent
Nunoya et al.

(10) Patent No.: US 9,184,597 B2
(45) Date of Patent: Nov. 10, 2015

(54) NON-CONTACT POWER FEEDING APPARATUS HAVING PLURALITY OF POWER SUPPLIES

(75) Inventors: Makoto Nunoya, Osaka (JP); Akira Murota, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 641 days.

(21) Appl. No.: 13/543,020

(22) Filed: Jul. 6, 2012

(65) Prior Publication Data

US 2013/0009475 A1    Jan. 10, 2013

(30) Foreign Application Priority Data

Jul. 8, 2011    (JP) ................... 2011-151318

(51) Int. Cl.
*H02J 17/00* (2006.01)
*H02J 5/00* (2006.01)
*B60M 7/00* (2006.01)

(52) U.S. Cl.
CPC . *H02J 5/005* (2013.01); *B60M 7/00* (2013.01); *Y10T 307/50* (2015.04)

(58) Field of Classification Search
None
See application file for complete search history.

(56) References Cited

U.S. PATENT DOCUMENTS

| | | | | |
|---|---|---|---|---|
| 5,995,350 | A * | 11/1999 | Kopelman | 361/103 |
| 6,721,159 | B2 | 4/2004 | Takashige et al. | 361/170 |
| 8,212,415 | B2 | 7/2012 | Kojima | 307/104 |

FOREIGN PATENT DOCUMENTS

| | | | | |
|---|---|---|---|---|
| CN | 101640439 | | 2/2010 | ............ H02J 17/00 |
| JP | 2000-217277 | | 8/2000 | ............ H02J 17/00 |
| JP | 2002-84686 | | 3/2002 | ............ H02J 17/00 |
| JP | 2004166323 | A * | 6/2004 | |
| JP | 2004-203178 | | 7/2004 | ............ B60L 5/00 |
| JP | 2006-205884 | | 8/2006 | ............ B61L 23/14 |
| JP | 4100168 | | 3/2008 | ............ B60M 7/00 |
| JP | 2010-200571 | | 9/2010 | ............ H02J 17/00 |

OTHER PUBLICATIONS

Office Action (dated Jul. 2, 2013) issued in connection with corresponding Japanese Patent Application No. 2011-151318 (originally submitted in an IDS filed Jul. 15, 2013). Concise explanation in English of the Japanese Office Action (dated Jul. 2, 2013), issued in connection with corresponding Japanese Patent Application No. 2011-151318.

(Continued)

*Primary Examiner* — Rexford Barnie
*Assistant Examiner* — David Shiao
(74) *Attorney, Agent, or Firm* — Kusner & Jaffe

(57) ABSTRACT

Three power supply devices 31 are connected in series via a transmission and receiving coupler 32 to the feeder 12, a short-circuit switch 38 that short-circuits both ends of each transmission coupler 32B is provided, a circuit including three receiving couplers 32A and the feeder 12 is set to a series resonant circuit at a predetermined frequency f, impedance of a circuit including each transmission coupler 32B, and a line connecting the power supply device 31 and the transmission coupler 32B is set to capacitive reactance at the predetermined frequency f, and an voltage to be output to the circuit including the line is controlled while a current flowing through the feeder 12 is being fed back to output a constant current of the predetermined frequency f to the feeder.

5 Claims, 7 Drawing Sheets

(56) References Cited

OTHER PUBLICATIONS

Chinese Office Action issued in connection with corresponding Chinese Patent Application No. 201210215668.9, dated Jul. 2, 2015.

Office Action (dated Jul. 2, 2015) issued in connection with corresponding Chinese Patent Application No. 201210215668.9 (originally submitted in an IDS filed Aug. 5, 2015).

* cited by examiner

NON-CONTACT POWER FEEDING APPARATUS HAVING PLURALITY OF POWER SUPPLIES

FIELD OF THE INVENTION

The present invention relates to a non-contact power feeding apparatus that supplies power from a power supply device to an object to which power is to be supplied in a non-contact manner.

BACKGROUND OF THE INVENTION

As disclosed in, for example, Japanese Patent No. 4100168, a known non-contact power feeding apparatus is configured so that a plurality of power supply devices that supply currents with synchronized current phases are connected in series to a feeder, and during power feeding, a power supply device is turned on in the feeder depending on the number of carriages to which power is to be supplied so that power can be supplied depending on the number of carriages.

The non-contact power feeding apparatus is configured so that a short-circuit unit causes a short-circuit between a current device and the feeder without stopping the entire power feeding apparatus, and thus only any one of the power supply devices can be stopped (separated) during power feeding, thereby allowing maintenance of the power supply device during operation.

However, the configuration of the known non-contact power feeding apparatus described above has the following problems:

(1) When the number of carriages exceeds an allowable number, a new power supply device is turned on, and power consumption of carriages changes in real time depending on changes in load (rotation number of a drive motor or the like) on the carriages. Thus, only with control of the number of carriages, power supply devices more than necessary may be turned on in the feeder, which may cause waste of power.

(2) On a side of the carriage, power is consumed irrespective of a state of the power supply device. Thus, when a problem occurs in the power supply device, the carriage may immediately run out of power.

(3) During supply of power from the other power supply device to the feeder, the short-circuit unit causes a short-circuit between a stopping power supply device and the feeder, and thereby the power supply device and the feeder are electrically separated, but connection between the stopping power supply device and the feeder is mechanically maintained. Thus, it is difficult to maintain the stopping power supply device at ease.

DISCLOSURE OF THE INVENTION

Thus, the present invention has an object to provide a non-contact power feeding apparatus that solves these problems, can reduce the risk of stop of power feeding to a feeder, can save energy by supplying optimum power depending on varying power consumption, and can handle a stopping power supply device with safety.

To achieve the object, the present invention provides a non-contact power feeding apparatus including: a feeder; and a plurality of power supply devices that synchronously supply a constant current of a predetermined frequency to the feeder, the feeder supplying power to a load with varying power consumption in a non-contact manner, wherein the non-contact power feeding apparatus further includes a transmission and receiving coupler including a receiving coupler connected in series to the feeder and a transmission coupler connected to the power supply device, correspondingly to each power supply device, the transmission and receiving coupler each includes a separation switch that electrically separates a power supply device corresponding to each transmission and receiving coupler from the feeder, a circuit including a plurality of receiving couplers and the feeder is set to a series resonant circuit at the predetermined frequency, impedance of a circuit including the transmission coupler, and a power line connecting the power supply device and the transmission coupler is set to capacitive reactance at the predetermined frequency, the power supply device is configured so that an output voltage to be output to the circuit including the power line is controlled while the current flowing through the feeder is being fed back to output a constant current of the predetermined frequency to the feeder, and an order of stopping depending on a decrease in power consumption of the load is set for the power supply devices, and when power consumption of the load decreases, a power supply device to be stopped is determined by the order, and the separation switch corresponding to the power supply device to be stopped is short-circuited.

Such a configuration provides technical advantages as described below:

(1) Each power supply device is connected in series to the feeder via the transmission and receiving coupler, the plurality of power supply devices can supply power to the feeder. Thus, even if a power supply device with an abnormality is separated from the feeder, the other power supply device can continuously supply a current, thereby increasing reliability of the apparatus.

(2) The power supply device can be separated (brought into a sleep state) depending on varying power consumption, thereby saving power while supplying optimum power, maintaining a constant current at that time, and preventing an influence on the feeder.

(3) The transmission coupler of the transmission and receiving coupler is mechanically separated from the receiving coupler, and thus the power supply device can be electrically and mechanically separated from the feeder, thereby allowing safe maintenance of the power supply device.

(4) The circuit on the side of the power line is set to the capacitive reactance, and thus when an output voltage of a pressure reducing circuit is controlled to perform feedback control to provide a constant current of the feeder, an increasing output voltage is smaller than an output voltage set by the capacitive reactance, thereby facilitating voltage control.

DESCRIPTION OF THE EMBODIMENTS

Now, embodiments of the present invention will be described with reference to the drawings.

[Embodiment 1]

Figure 1:
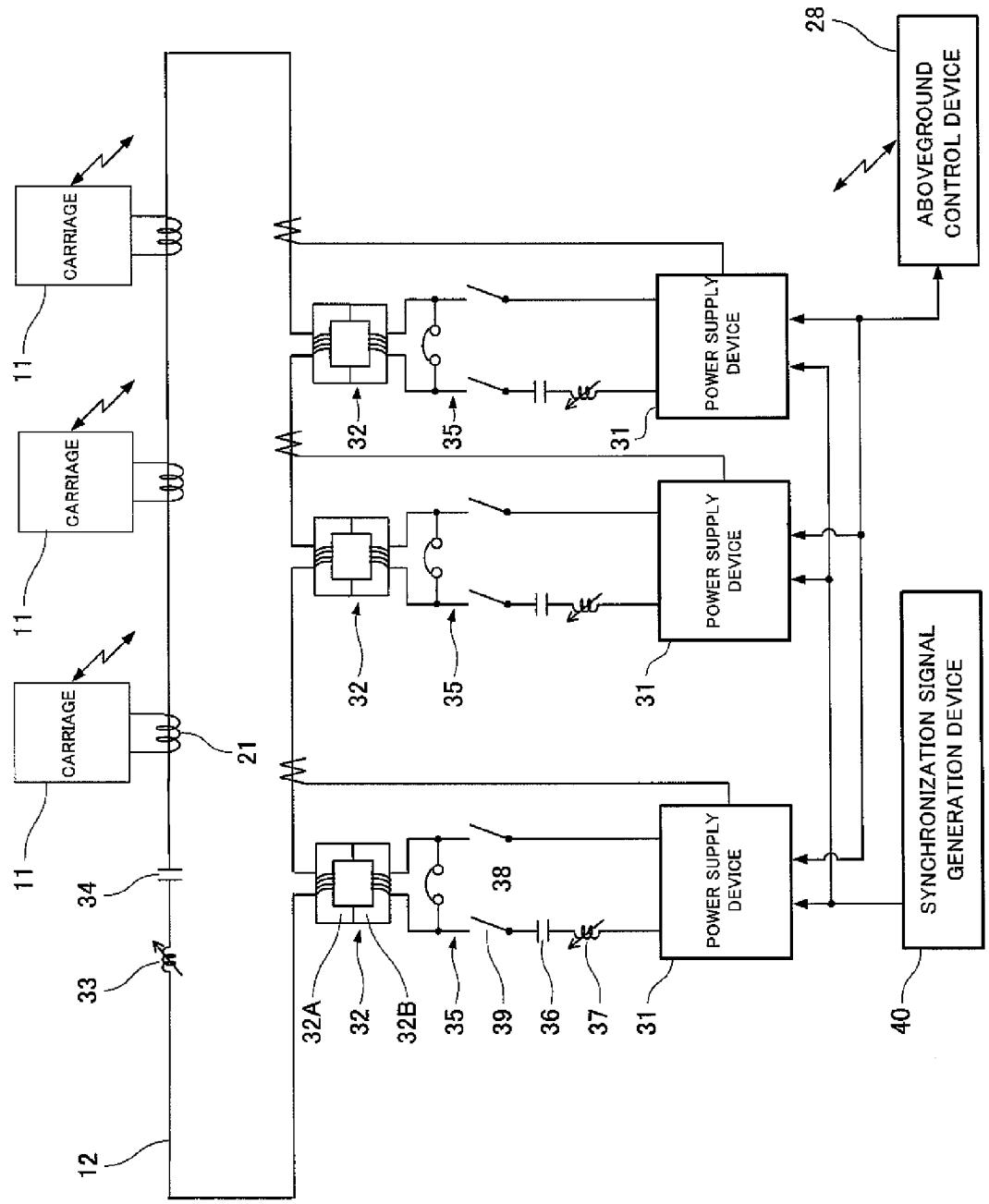
FIG. 1 is a configuration diagram of a non-contact power feeding apparatus in Embodiment 1 of the present invention.

FIG. 1 is a configuration diagram of a non-contact power feeding apparatus in Embodiment 1. The non-contact power feeding apparatus supplies power to a plurality of carriages (an example of an object to which power is to be supplied) 11 in a non-contact manner, and a feeder 12 that supplies a constant current of a predetermined frequency f (for example, 10 kHz) is laid along a path of the carriages 11.

"Carriage"

Figure 2:
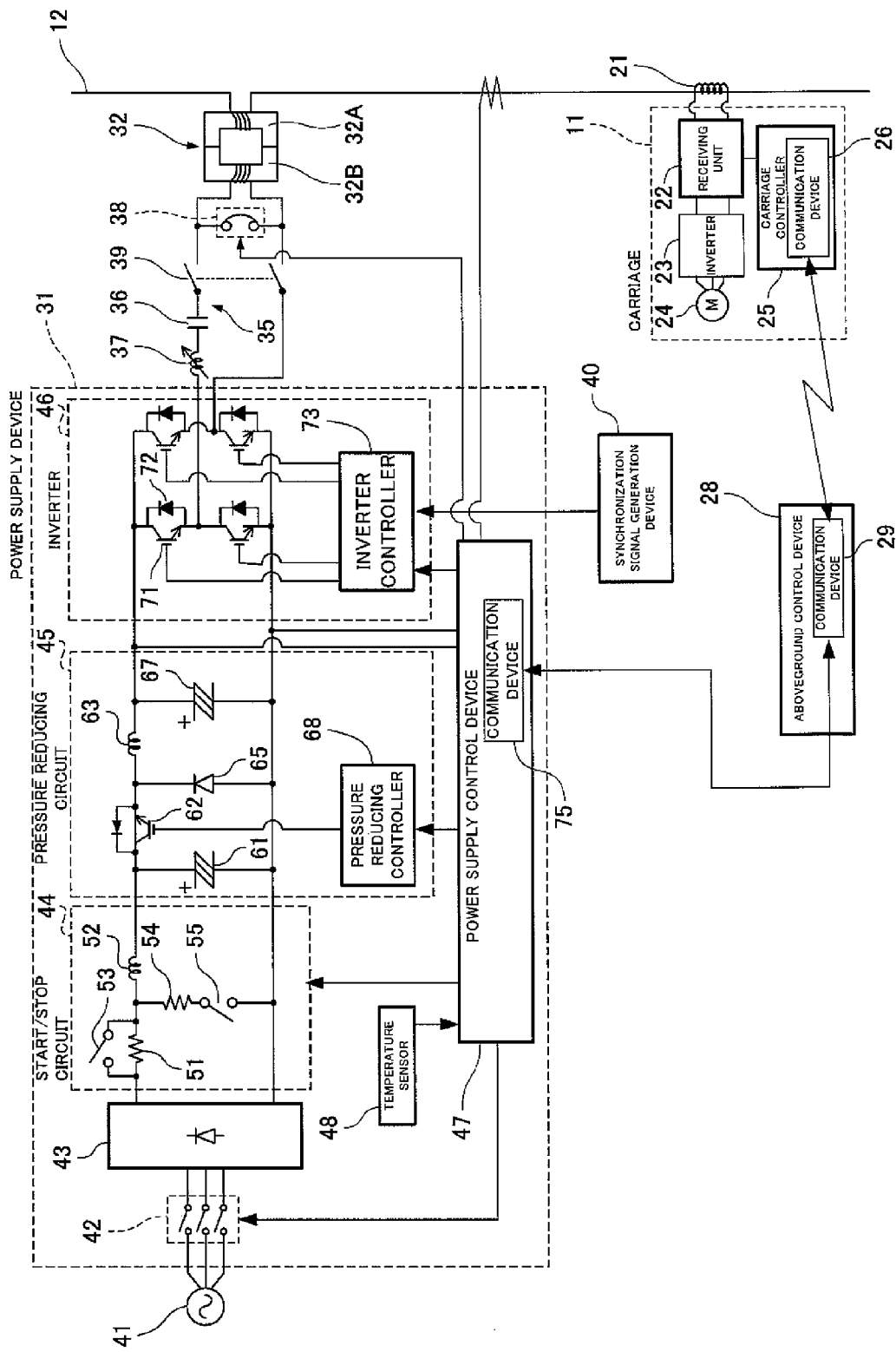
FIG. 2 is a circuit configuration diagram of the non-contact power feeding apparatus in Embodiment 1 of the present invention.

As shown in FIG. 2, the carriage 11 includes a receiving coil 21 in which an electromotive force is induced by the feeder 12. A receiving unit 22 is connected to the receiving coil 21, a drive motor (an example of a load with varying power consumption) 24 for causing the carriage 11 to travel is connected to the receiving unit 22 via an inverter 23, and power is supplied to the drive motor 24 by the electromotive force induced in the receiving coil 21. The carriage 11 also includes a controller (carriage controller) 25 for controlling traveling of the carriage 11, and by a command from the carriage controller 25, the inverter 23 is driven to control the traveling of the carriage 11. The carriage controller 25 includes a communication device 26. The communication device 26 performs communication with a communication device 29 of an aboveground control device 28 described later to receive a destination (for example, a station) of the carriage 11 or a power reducing command (described later) from the aboveground control device 28, and transmit power consumption fed back from the inverter 23 to the aboveground control device 28 as an example of a state of the carriage 11. When the power reducing command is input to the carriage controller 25, the carriage controller 25 performs control to reduce rotation numbers of the drive motor 24 or stop the drive motor 24 to reduce power consumption.

"Feeder 12 or the Like"

As shown in FIG. 1, a plurality of (three in Embodiment 1) identical power supply devices 31 are connected in series via a transmission and receiving couplers 32 to the feeder 12, and the power supply devices 31 supply a constant current of a predetermined frequency f to the feeder 12. Now, this will be described in detail.

The transmission and receiving coupler 32 includes a receiving coupler 32A and a transmission coupler 32B mechanically connected, and a turn ratio between the receiving coupler 32A and the transmission coupler 323 is 1:1.

A reactor 33 and a capacitor 34 that adjust impedance are connected in series to the feeder 12, and a circuit in which three receiving couplers 32A, the feeder 12, the reactor 33, and the capacitor 34 are connected in series is formed into a series resonant circuit of a predetermined frequency f.

A capacitor 36 and a reactor 37 that adjust impedance are connected in series to a power line 35 that connects each transmission coupler 32B and the power supply device 31, and impedance at the predetermined frequency f of a circuit in which the transmission couplers 32B, the capacitor 36, and the reactor 37 are connected in series is adjusted (set) to a predetermined capacitive reactance. A short-circuit switch 38 that short-circuits both ends of the transmission coupler 32B is connected to the both ends of the transmission coupler 32B. A manual switch (disconnector) 39 that separates the transmission coupler 32B from the short-circuit switch 38 manually by an operator is provided on a side closer to the power supply device 31 than the short-circuit switch 38. The manual switch 39 is normally closed. The short-circuit switch 38 constitutes a separation switch that electrically separates the power supply device 31 provided in and corresponding to each transmission and receiving coupler 32 from the feeder 12.

A synchronization signal generation device 40 is provided together with the aboveground control device 28, and outputs a synchronization signal of a predetermined frequency f to each power supply device 31.

"Aboveground Control Device 28"

The aboveground control device 28 includes the communication device 29 and has a function described below.

In the aboveground control device 28, an order of bringing each power supply device 31 into a sleep state (order of stopping) is set, and power that all the power supply devices 31 can supply is set. Power consumption is input from each carriage 11 via the communication device 29, and the power consumption is added to calculate power consumed by all the carriages 11. From each power supply device 31, a measured output voltage (described later) of a pressure reducing circuit 45 and a temperature abnormality signal (described later) when a temperature in the device reaches a previously set temperature or more are input.

(1) When the output voltage that has been input of the pressure reducing circuit 45 in the power supply device 31 decreases to the previously set voltage (when power consumed by the feeder 12 to which a constant current is supplied decreases, an output voltage of each power supply device 31 decreases), it is determined that the power supply device 31 can be brought into a sleep state, the power supply device 31 to be stopped is determined according to the order of sleep, and a separation order is output to the determined power supply device 31.

(2) With one or two power supply devices 31 in a sleep state, when the output voltage that has been input of the pressure reducing circuit 45 increases to the previously set voltage (when power consumed by the feeder 12 to which the constant current is supplied increases, an output voltage of each power supply device 31 increases), or when the power supply device 31 during power feeding (during operation) inputs a temperature abnormality signal described later, it is determined that the number of power supply devices 31 is insufficient and the power supply device 31 in the sleep state needs to be turned on, and a turn-on command is output to the power supply device 31 in the sleep state.

(3) It is determined whether the power consumed by all the carriages 11 is closer to power (power of a predetermined rate; threshold power) close to power that can be supplied by the all the power supply devices 31. When the power exceeds the threshold power, a "power reducing command" to reduce power consumption is output to each carriage 11 via the communication device 29. When the power reducing command is input to the carriage controller 25 via the communication device 26, the carriage controller 25, for example, reduces a traveling speed or stops the carriage 11, and reduces power consumption.

"Power Supply Device"

As shown in FIG. 2, an AC power supply 41 that supplies power to the power supply device 31 is connected to the power supply device 31, the power supply device 31 includes a turn-on switch 42 constituted by an electromagnetic circuit breaker that connects and separates the AC power supply 41, a rectifier (full-wave rectifier) 43 that converts an AC current of the AC power supply 41 input via the turn-on switch 42 into the DC current, a start/stop circuit 44, a pressure reducing circuit 45 (rated voltage is, for example, 240 V) that reduces pressure of a DC voltage (for example, 297 V) applied from the rectifier (full-wave rectifier) 43 via the start/stop circuit 44, an inverter 46 to which an synchronization signal of a predetermined frequency f is input from the synchronization signal generation device 40, and a power supply control device 47. With such a configuration, a DC voltage (bus voltage) output from the pressure reducing circuit 45 to the inverter 46 is controlled based on a fed-back current of the feeder 12, thus feedback control is performed to provide a constant current of the feeder 12, and the current is synchronously converted into a current (AC current) of a predetermined frequency f by the inverter 46 and output to the feeder 12 (details will be described later). A temperature sensor 48 is provided in the power supply device 31, and data on a detected temperature is input to the power supply control device 47.

The start/stop circuit 44 includes an inrush resistance 51 and a coil (reactor) 52 connected in series between the rectifier 43 and the pressure reducing circuit 45, a start conductor 53 that short-circuits the inrush resistance 51, and a discharge resistance 54 and a stop conductor 55 connected in series between a connection point between the inrush resistance 51 and the coil 52 and the rectifier 43.

The pressure reducing circuit 45 includes an input capacitor 61 connected in parallel with an output of the start/stop circuit 44, a pressure reducing switching element 62 and a coil 63 connected in series between the start/stop circuit 44 and the inverter 46, a diode 65 having a cathode connected to a connection point between the pressure reducing switching element 62 and the coil 63, an output capacitor 67 having one end connected to a connection point between the coil 63 and the inverter 46 and connected in parallel with the inverter 46, and a pressure reducing controller 68 that performs pulse control of the pressure reducing switching element 62.

The pressure reducing controller 68 performs pulse control of the pressure reducing switching element 62 according to a command from the power supply control device 47, and an applied DC voltage, for example, of 297 V is reduced in pressure within a range of 280 to 200 V (rated voltage is, for example, 240 V) and output to the inverter 46. Thus, feedback control is performed to provide a constant current of the feeder 12 (details will be described later). When the command from the power supply control device 47 is a "voltage increasing command", an ON time of a pulse output to the pressure reducing switching element 62 is gradually increased to increase an output voltage. On the other hand, when the command is a "voltage reducing command", the ON time of the pulse output to the pressure reducing switching element 62 is gradually reduced to reduce the output voltage. When any of the commands are not input, a constant ON time of the pulse is maintained to maintain a constant output voltage. When an abnormality occurs in the pressure reducing switching element 62 to make pressure reducing control impossible, an abnormality signal is output to the power supply control device 47.

The inverter 46 includes a switching element 71 constituted by IGBTs connected in a full-bridge, a diode 72 connected to both ends of each switching element 71 so that a current flows in a direction opposite to that of a current flowing through each switching element 71, and an inverter controller 73.

When a start command is input from the power supply control device 47 to the inverter controller 73, the inverter controller 73 outputs a gate signal of a rectangular wave in synchronization with a synchronization signal of a predetermined frequency f input from the synchronization signal generation device 40, two switching elements 71 on a lower side connected to a negative side of the DC current are brought into conduction of 180°, and two switching elements 71 on an upper side connected to a positive side of the DC current are brought into conduction of substantially 120°. By this control, the DC current is synchronously converted into an AC current of a predetermined frequency f and supplied to the feeder 12. As such, the inverter 46 has a constant pulse width (duty), and has a function of converting the DC current into the current of a predetermined frequency f. When a stop command is input from the power supply control device 47, the inverter 46 stops driving of the switching element 71 to stop an output of the current. When an abnormality occurs in the switching element 71 to make frequency control impossible, the inverter 46 outputs an abnormality signal to the power supply control device 47.

The power supply control device 47 includes a communication device 75 that performs data communication with the communication device 29 of the aboveground control device 28. The power supply control device 47 measures an output voltage of the pressure reducing circuit 45 and a current flowing through the feeder 12, and monitors whether a temperature in the device is a previously set temperature (temperature increased by heating due to overload or near overload on the switching elements 62 and 71) or more from temperature data input from the temperature sensor 48. The power supply control device 47 transmits the output voltage that is being measured of the pressure reducing circuit 45 to the aboveground control device 28, and transmits an temperature abnormality signal when the temperature in the device reaches the previously set temperature or more, while receives from the aboveground control device 28 a turn-on command in the feeder 12 and a separation command from the feeder 12.

The power supply control device 47 has a constant current control function of controlling an output current to a constant current, and a turn-on/separation function of turning on the power supply device 31 in the feeder 12 and separating the power supply device 31 from the feeder 12.

Figure 3:
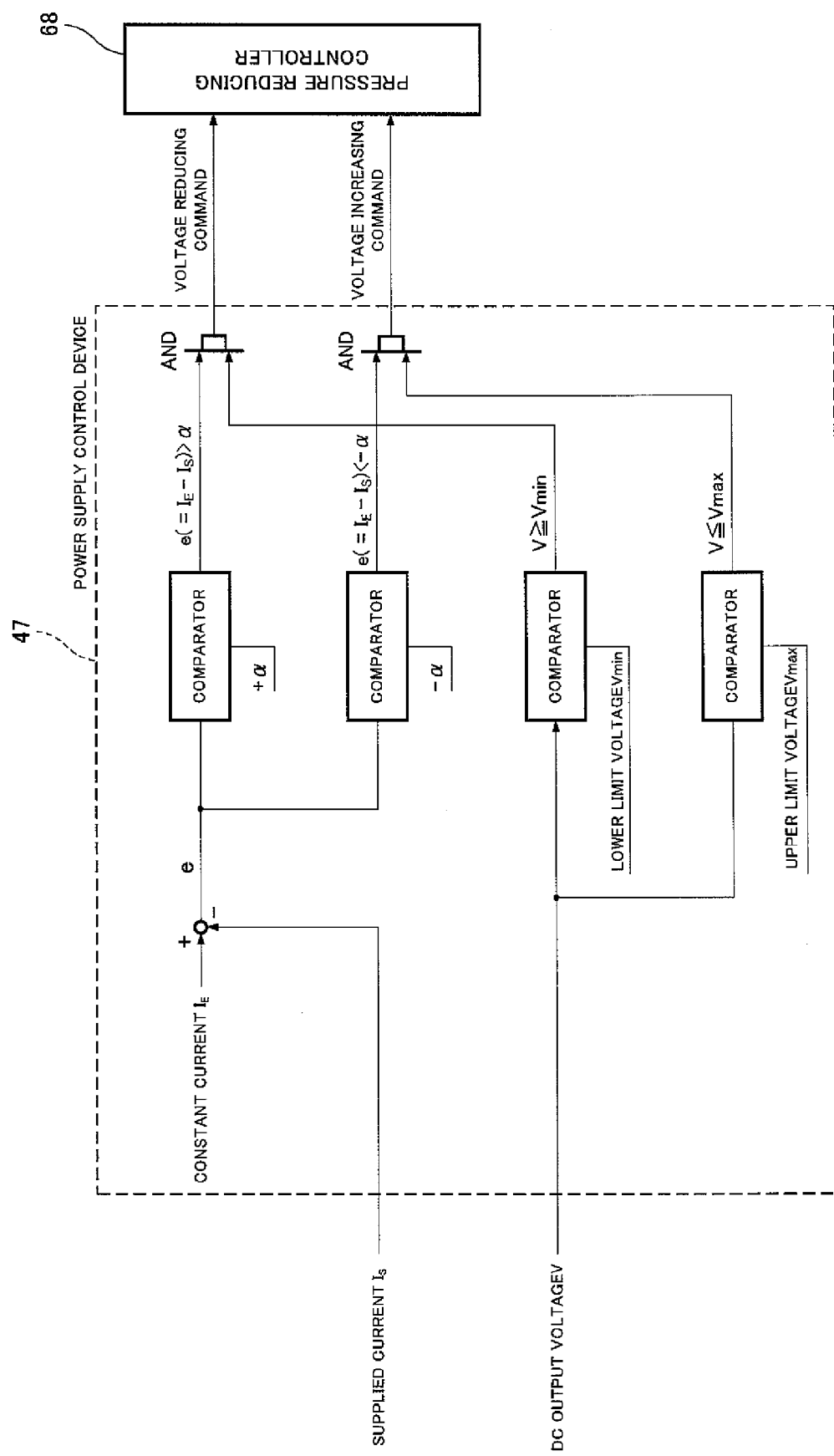
FIG. 3 is a constant current control block diagram of a power supply control device in a power supply device of the non-contact power feeding apparatus in Embodiment 1 of the present invention.

As shown in FIG. 3, the constant current control function controls the output voltage of the power supply device 31 according to a current of the feeder 12. Specifically, a feedback current flowing through the feeder 12 is subtracted from a target constant current (for example, 80 A) to calculate a deviation e. When the deviation e is plus α (positive constant close to zero) or more, and the output voltage of the pressure reducing circuit 45 is a lower limit voltage (for example, 200 V) or more, the "voltage reducing command" is output to the pressure reducing circuit 45, while when the deviation e is minus α or less, and the output voltage of the pressure reducing circuit 45 is an upper limit voltage (for example, 280 V) or less, the "voltage increasing command" is output to the pressure reducing circuit 45. Thus, as described above, the output voltage of the pressure reducing circuit 45 is controlled to perform feedback control to provide a constant current of the feeder 12.

Figure 4A:
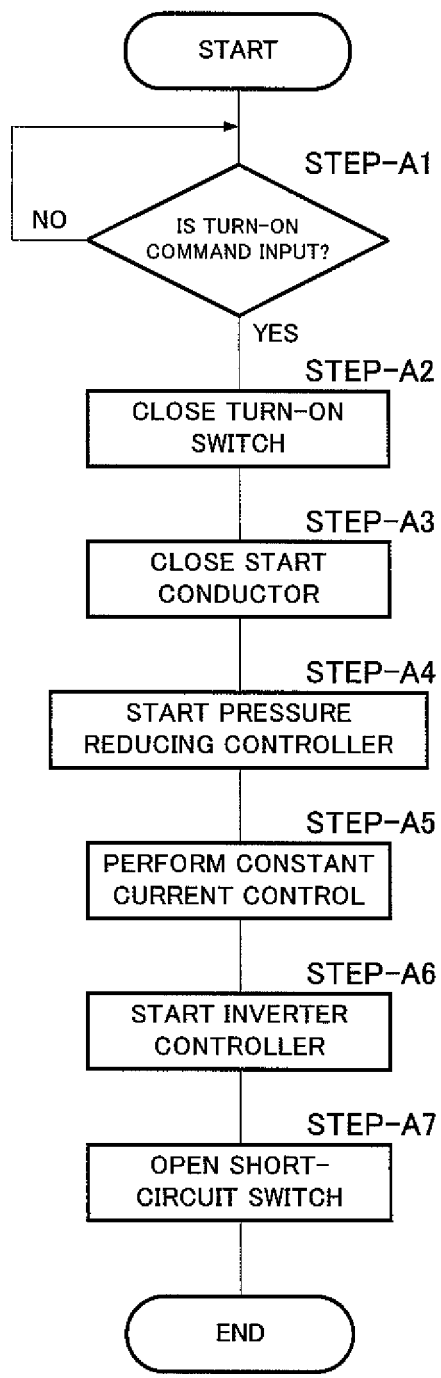
FIG. 4 is a flowchart showing start and stop procedures of the power supply device of the non-contact power feeding apparatus in Embodiment 1 of the present invention.
Figure 4B:
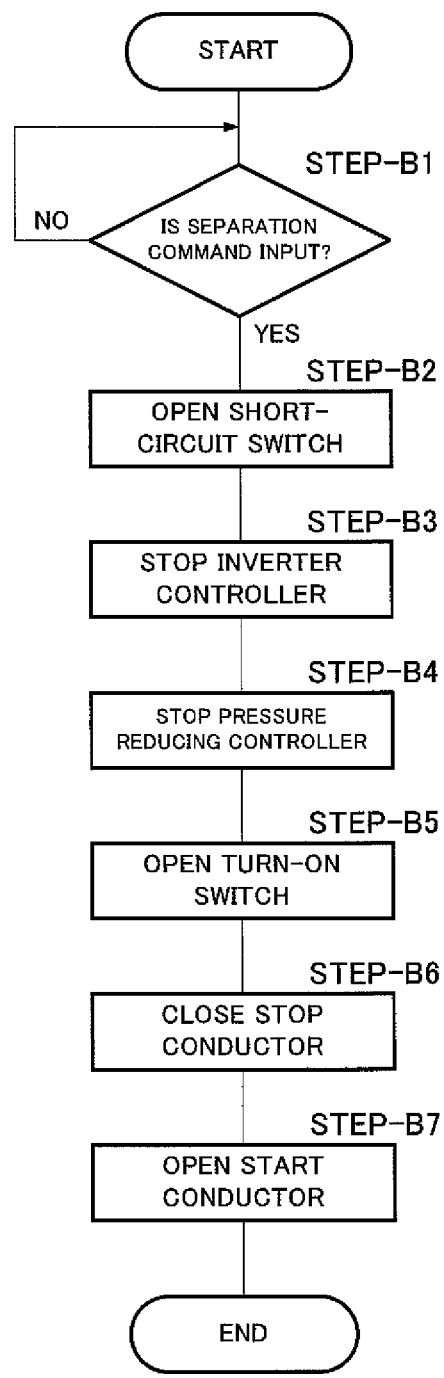

With reference to flowcharts in FIGS. 4A and 4B, the turn-on/separation function will be described.

"Turn-on Time"

Before turn-on, the switching elements 62 and 71 of the pressure reducing circuit 45 and the inverter 46 are not driven but in an OFF state, the turn-on switch 42 is opened, the start conductor 53 of the start/stop circuit 44 is opened, the stop conductor 55 is opened, and further the short-circuit switch 38 is closed (short-circuit state). The manual switch 39 is normally closed.

In such a state, the turn-on command is input from the aboveground control device 28 to the power supply control device 47 (Step-A1). Then, the power supply control device 47 first closes the turn-on switch 42 to connect the AC power supply 41 (Step-A2). At this time, the start conductor 53 is opened, and thus the inrush resistance 51 reduces an inrush current. Then, the start conductor 53 is closed after a predetermined time from driving of the turn-on switch 42 to short-circuit the inrush resistance 51 (Step-A3).

Then, a start command is output to the pressure reducing controller 68 (Step-A4). Then, the constant current control function outputs the voltage increasing command and the voltage reducing command to drive the pressure reducing switching element 62 of the pressure reducing circuit 45 (Step-A5). The output voltage (bus voltage) of the pressure reducing circuit 45 is thus controlled so as to provide a current flowing through the feeder 12.

Then, the start command is output to the inverter controller 73 of the inverter 46 to drive the switching element 71 (Step-A6). As described above, the inverter controller 73 outputs a current of a predetermined frequency f to the power line 35.

Then, the short-circuit switch 38 is opened, and the power supply device 31 is turned on in the feeder 12 via the transmission and receiving coupler 32 (Step-A7).

"Separation Stop Time"

When the separation command is input from the aboveground control device 28 to the power supply control device 47 (Step-B1), the power supply control device 47 first closes the short-circuit switch 38 (short-circuit state) to electrically separate the power supply device 31 from the feeder 12 (Step-B2).

Then, a stop command is output to the inverter controller 73 of the inverter 46 to stop driving of the switching element 71 (Step-B3), and a stop command is output to the pressure reducing controller 68 to stop the pressure reducing switching element 62 (Step-B4).

Then, the turn-on switch 42 is opened and separated from the AC power supply 41 (Step-B5), and then the stop conductor 55 is closed to consume charges accumulated in the power supply device 31 by the discharge resistance 54 (Step-B6), then the start conductor 53 is opened (Step-B7), and the process is finished.

When an abnormality signal is input from the pressure reducing controller 68 or the inverter controller 73, an abnormality stop signal is output to the aboveground control device 28.

Operations by the configuration described above will be described.

It is supposed that three power supply devices 31 provided in series supply a constant current (for example, 80 A) of a predetermined frequency f to the feeder 12. At this time, output currents (constant currents) of the power supply devices 31 are synchronized, and do not cancel each other, and each power supply device 31 can supply a current to the carriage (load) 11.

For the output voltage of the power supply device 31, when no load is applied to the feeder 12 (when the carriage 11 is not receiving power), the impedance including the receiving coupler 32A is zero (resonant circuit). Thus, the output voltage of the power supply device 31 is calculated by multiplying the constant current supplied to the feeder 12 by capacitive reactance set to a circuit on the side of the power line 35, and set to a high voltage (for example, 240 V). When a load is applied to the feeder 12 (when the carriage 11 starts receiving power), the power supply device 31 recognizes the load as an increase in resistance, and a voltage calculated by multiplying the resistance by a constant current is shared by the power supply devices 31 to increase the output voltage, thereby maintaining a constant current. Specifically, the constant current control function controls the output voltage of the pressure reducing circuit 45 to perform, feedback control so as to provide a constant current of the feeder 12. At this time, the increasing output voltage is smaller than a voltage set by the capacitive reactance, facilitating voltage control. The power supply devices 31 during operation share and supply the same power and thus an identical output voltage of the pressure reducing circuit 45 is obtained.

When an impedance on the side of the power line 35 is zero (when a series resonant circuit is formed), the output voltage needs to be sharply increased from a no-load state substantially at 0 V to an output voltage calculated by multiplying the resistance by the constant current, which makes control difficult.

According to power consumption of the load, that is, the output voltage of the pressure reducing circuit 45, the number of power supply devices 31 to be operated among the three power supply devices 31 is determined, and when the output voltage of the pressure reducing circuit 45 decreases (power consumption of the load decreases), a power supply device 31 to be stopped is determined according to an order of sleep, and a separation command is output to the power supply device 31 to be stopped. Thus, the short-circuit switch 38 of the power supply device 31 to be stopped is short-circuited, and the power supply device 31 to be stopped is separated from the feeder 12 and brought into a sleep state. Then, a voltage applied to the feeder 12 decreases by an amount for the power supply device 31 in the sleep state to reduce a current value of the feeder 12. Thus, the output voltage (bus voltage) of the pressure reducing circuit 45 in the remaining power supply device 31 is increased by feedback control to maintain a constant current.

When an abnormality occurs in the power supply device 31, the short-circuit switch 38 is short-circuited, the power supply device 31 is separated from the feeder 12 and stops in an abnormal manner. At this time, a voltage applied to the feeder 12 decreases by an amount for the stopping power supply device 31 to reduce a current value of the feeder 12. Thus, the output voltage (bus voltage) of the pressure reducing circuit 45 in the remaining power supply device 31 is increased by feedback control, and the remaining power supply device 31 performs backup of power to be supplied to the feeder 12. When output power of the remaining power supply device 31 is insufficient, a "power reducing command" is output to the carriage 11 to reduce the load on the feeder 12, thereby eliminating the risk of overload of the remaining power supply device 31 and inability to supply power.

When the output current of the power supply device 31 to be stopped is stopped without short-circuit, capacitive reactance on the side of the power line 35 including the transmission coupler 32B is the load on the feeder 12, and thus output power of the other power supply devices 31 increases, and there is no point to bring the power supply device 31 into a sleep state.

In contrary, when the output voltage of the pressure reducing circuit 45 increases (power consumption of the load increases), a turn-on command is output to the power supply device 31 in the sleep state. Thus, the power supply device 31 in the sleep state generates a synchronized constant current of a predetermined frequency f, then the short-circuit switch 38 is opened, and the power supply device 31 is turned on in the feeder 12. Then, the voltage applied to the feeder 12 increases by an amount for the power supply device 31 newly turned on to increase the current value of the feeder 12. Thus, the output voltage (bus voltage) of the pressure reducing circuit 45 of the remaining power supply device 31 is reduced by feedback control to maintain a constant current.

Whether an overload is applied or not is monitored by a temperature in the power supply device 31. When it is determined that an overload is applied, a turn-on command is output to a power supply device 31 in a sleep state in the case where there is a power supply device 31 in the sleep state. When there is no power supply device 31 in the sleep state, a "power reducing command" is output to the carriage 11 to reduce the load on the feeder 12.

When power consumption of all the carriages 11 exceeds the threshold power, a power reducing command is output to the carriages 11 to reduce the load on the feeder 12.

The transmission coupler 32B and the receiving coupler 32A of the transmission and receiving coupler 32 can be mechanically separated, and thus the operator can mechanically completely separate the power supply device 31 from the feeder 12 in any manner.

During maintenance of the power supply device 31, the operator opens the manual switch 39 with the power supply device 31 in the sleep state (short-circuit switch 38 in a short circuit state), and thus the power supply device 31 is electrically and mechanically separated from the feeder 12 to provide safe maintenance.

As described above, according to Embodiment 1, the three power supply devices 31 supply power to the feeder 12. Thus, even if an abnormality occurs in one power supply device 31, the other two power supply devices 31 can provide backup (when power is insufficient, a power reducing command is output to the carriage 11), thereby reducing the risk of power outage of the feeder 12. The power supply device 31 is brought into a sleep state depending on varying power consumption, and power can be saved while optimum power is being supplied. At this time, the remaining power supply devices 31 can maintain a constant current to prevent variation in the current of the feeder 12.

According to Embodiment 1, the circuit on the side of the power line 35 is set to the capacitive reactance. Thus, when the output voltage of the pressure reducing circuit 45 is controlled to perform feedback control to provide a constant current of the feeder 12, an increasing output voltage is smaller than a voltage set by the capacitive reactance, thereby facilitating voltage control.

According to Embodiment 1, whether an overload is applied or not is monitored by a temperature in the power supply device 31. When there is a power supply device 31 in the sleep state, an turn-on command is output to the power supply device 31 in the sleep state, while when there is no power supply device 31 in the sleep state, a power reducing command is output to the carriage 11 to reduce the load on the feeder 12, thereby preventing the overload of the power supply device 31.

According to Embodiment 1, when power consumption of all the carriages 11 exceeds the threshold power, a "power reducing command" is output to the carriage 11 to reduce the load on the feeder 12, thereby eliminating the risk of overload of the power supply device 31 and inability to supply power.

According to Embodiment 1, the transmission coupler 32B of the transmission and receiving coupler 32 can be mechanically separated from the receiving coupler 32A to mechanically completely separate the power supply device 31 from the feeder 12 in an urgent manner. Thus, when some abnormality occurs or may occur in the power supply device 31 or the feeder 12, the power supply device 31 and the feeder 12 can be protected, and safe maintenance of the power supply device 31 can be performed.

According to Embodiment 1, the manual switch 39 of the power supply device 31 in the sleep state (short-circuit switch 38 in the short-circuit state) can be opened by the operator to electrically and mechanically separate the power supply device 31, and safe maintenance of the power supply device 31 can be performed.

Figure 5A:
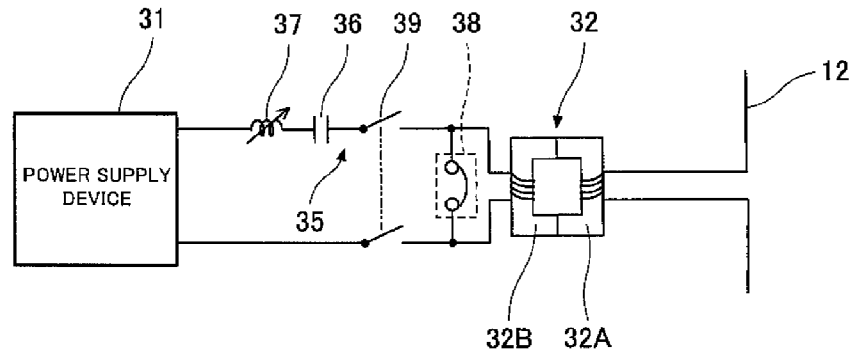
FIG. 5 shows another circuit configuration of the non-contact power feeding apparatus in Embodiment 1 of the present invention.
Figure 5B:
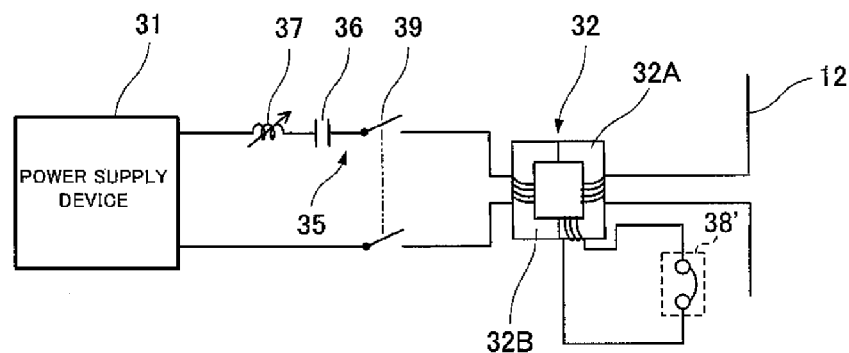

In Embodiment 1, as a separation switch that electrically separates the power supply device 31 from the feeder 12, as shown in FIG. 5A, the short-circuit switch 38 that short-circuits both ends of the transmission coupler 32B is provided at the both ends of the transmission coupler 32B. Instead of the short-circuit switch 38, as shown in FIG. 5B, a short-circuit switch 38' may be provided that short-circuits both ends of a coil 77 wound around the receiving coupler 32A and corresponding to a tertiary winding.

The short-circuit switch 38' is opened when the power supply device 31 supplies power to the feeder 12. When the separation command is input from the aboveground control device 28 to the power supply control device 47, the power supply control device 47 closes the short-circuit switch 38' (in the short-circuit state) to short-circuit the both ends of the coil 77. Thus, a magnetic path formed between the transmission coupler 32B and the receiving coupler 32A is interrupted, and thus the power supply device 31 can be electrically separated from the feeder 12. When the short-circuit switch 38' is opened, a magnetic force is generated between the transmission coupler 32B and the receiving coupler 32A, and a strong force is required to pull the transmission coupler 32B out of the receiving coupler 32A. However, when the short-circuit switch 38' is short-circuited, a magnetic force is eliminated from the receiving coupler 32A, thereby allowing easy removal of the transmission coupler 32B.

Figure 5C:
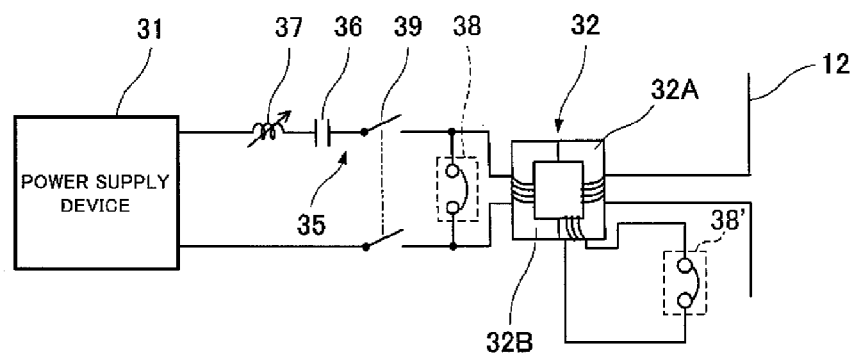

Also, as shown in FIG. 5C, both the short-circuit switch 38 and the short-circuit switch 38' may be provided.

[Embodiment 2]

Figure 6:
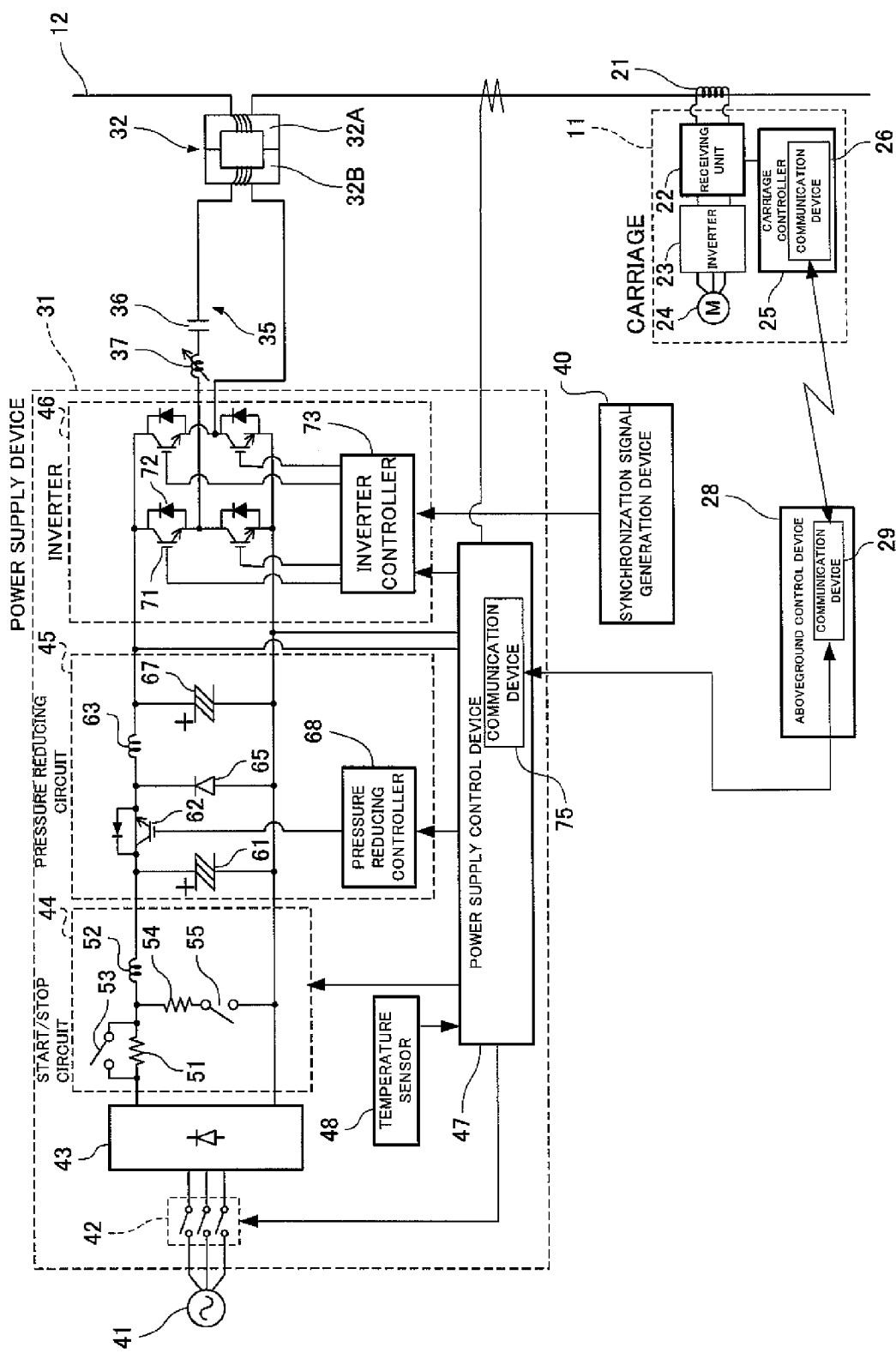
FIG. 6 is a circuit configuration diagram of a non-contact power feeding apparatus in Embodiment 2 of the present invention.

As shown in FIG. 6, in a non-contact power feeding apparatus according to Embodiment 2 of the present invention, the short-circuit switch 38 and the manual switch 39 in Embodiment 1 are not required, and further, a circuit including a transmission coupler 32B, a capacitor 36, and a reactor 37 connected in series is a series resonant circuit (zero impedance) at a predetermined frequency f.

Figure 7:
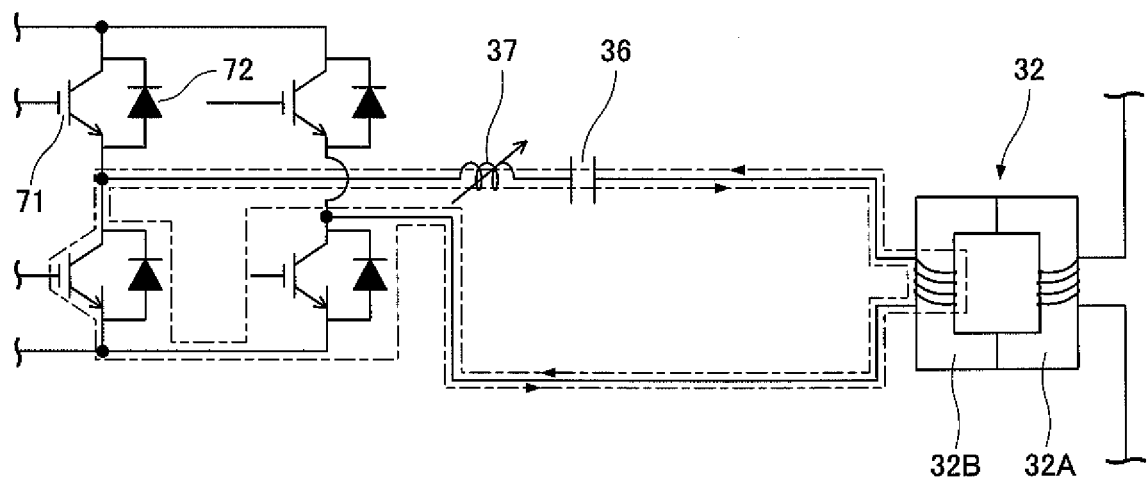
FIG. 7 illustrates a flow of a current during stop of the power supply device of the non-contact power feeding apparatus.

When a power supply device 31 is separated from a feeder 12, instead of a short-circuit switch 38 being short-circuited, an inverter controller 73 controls so that among switching elements 71 of an inverter 46, two upper switching elements 71 connected to a positive side of a DC current are not brought into conduction, but two lower switching elements 71 connected to a negative side of the DC current are brought into conduction of 180° according to a synchronization signal. When the switching element 71 is thus driven, no current flows from a pressure reducing circuit 45 as shown in FIG. 7, and the circuit including the transmission coupler 32B, the capacitor 36, and the reactor 37 connected in series is formed into a closed circuit by the two switching elements 71 connected to the negative side of the DC current and a diode 72 connected to both ends of the switching elements 71, and a constant current of a predetermined frequency f flows from the feeder 12. At this time, circuit impedance is zero at the predetermined frequency f and does not become a load on the feeder 12, thereby allowing separation of the power supply device 31.

Other configurations and operations are the same as in Embodiment 1, and descriptions thereof will be omitted.

As described above, according to Embodiment 2, the need to provide the short-circuit switch 38 can be eliminated. When the transmission coupler 32B of the transmission and receiving coupler 32 is mechanically separated form a receiving coupler 32A, circuit impedance on a side of a power line 35 is zero at the predetermined frequency f. Thus, an increase in load on the feeder 12 can be minimized, thereby allowing separation of the power supply device 31 without adding power from the other power supply device 31.

In Embodiments 1 and 2, the pressure reducing circuit 45 performs constant current control, but the inverter 46 may perform constant current control.

At this time, a current flowing through the feeder 12 is fed back to the inverter controller 73, a pulse width (duty) of each switching element 71 is calculated so as to provide a constant current, and each switching element 71 is driven in synchronization with a synchronization signal. Then, an output voltage to be output to a circuit including the power line 35 is controlled depending on a carriage (load) 11, and a constant current of a predetermined frequency f is output to the feeder 12.

Then, separation/turn-on of the power supply device 31 is performed by the pulse width (duty) as described below. Specifically, for three power supply devices 31, a pulse width (duty) is 120° with a normal load, but with a light load on the feeder 12, the pulse width (duty) is 100°. At that time, any one of the power supply devices 31 is separated (brought into a sleep state). Then, a voltage applied to the feeder 12 decreases by an amount for the power supply device 31 in the sleep state to reduce a current value of the feeder 12, and thus pulse widths (duties) of the remaining power supply devices 31 increase.

When the load on the feeder 12 increases, the pulse width (duty) is 140°, and the power supply device 31 in the sleep state at this time is turned on. Then, a voltage applied to the feeder 12 increases by an amount for the turned-on power supply device 31 to increase a current value of the feeder 12, thus pulse widths (duties) of the remaining power supply devices 31 decrease.

As such, the current flowing through the feeder 12 is fed back to change the pulse width (duty) of each switching element 71 of the inverter 46 so as to provide the constant current. Thus, an output voltage to be output to the circuit including the power line 35 is controlled, and the inverter 46 can perform constant current control at a predetermined frequency f. Also, the pulse width (duty) is monitored to recognize increase and decrease in the load, and when the load decreases, the power supply device 31 can be brought into a sleep state, and when the load increases, the power supply device 31 can be turned on. At this time, the pressure reducing circuit 45 may be omitted.

In Embodiments 1 and 2, the load is a plurality of carriages 11, but may be a load with varying power consumption. The three carriages 11 are provided, but more carriages 11 may be provided. The three power supply devices 31 are provided, but not limited to three, more power supply devices 31 may be provided and connected in series.

In Embodiments 1 and 2, the pressure reducing circuit 45 includes the pressure reducing controller 68, and the inverter 46 includes the inverter controller 73, but one controller may control both the pressure reducing circuit 45 and the inverter 46.

Having described the invention, the following is claimed:

1. A non-contact power feeding apparatus comprising:
    a feeder for supplying power to a load with varying power consumption in a non-contact manner;
    a plurality of power supply devices that synchronously supply a constant current of a predetermined frequency to the feeder; and
    a plurality of transmission and receiving couplers each corresponding to a respective power supply device of the plurality of power supply devices, each transmission and receiving coupler including (i) a receiving coupler connected in series to the feeder and (ii) a transmission coupler connected to its corresponding power supply device, wherein each transmission and receiving coupler includes a separation switch that electrically separates the power supply device corresponding to the corresponding transmission and receiving coupler from the feeder,
    wherein:
        a circuit including the plurality of receiving couplers and the feeder is set to have a series resonant frequency at the predetermined frequency,
        an impedance of each circuit including one of the plurality of transmission couplers and a corresponding power line connecting the corresponding power supply device and the corresponding transmission coupler is set to have a capacitive reactance corresponding to the predetermined frequency,
        each power supply device is configured so that an output voltage to be output to each circuit including the power line is controlled while the current flowing through the feeder is being fed back to output a constant current of the predetermined frequency to the feeder, and
        an order of stopping is set for the power supply devices, the power supply devices being selectively stopped depending on a decrease in power consumption of the load, a power supply device to be stopped is determined by the order, and the separation switch corresponding to the power supply device to be stopped is short-circuited to short circuit both ends of a conductor forming a winding of the corresponding transmission coupler.

2. The non-contact power feeding apparatus according to claim 1, wherein the load includes a plurality of objects to which power is to be supplied,
    wherein power consumption of the load is calculated by adding power consumption of the objects to which power is to be supplied, and when the calculated power consumption of the load reaches a predetermined rate of output power of all the power supply devices, a command to reduce power to the objects to which power is to be supplied is issued.

3. The non-contact power feeding apparatus according to claim 2, wherein each power supply device includes a temperature sensor that detects a temperature in the corresponding power supply device, and when the temperature detected by the temperature sensor is higher than a temperature reached due to overload or near overload of the corresponding power supply device, a command to reduce power to the objects to which power is to be supplied is issued.

4. A non-contact power feeding apparatus comprising:
    a feeder for supplying power to a load with varying power consumption in a non-contact manner;
    a plurality of power supply devices that synchronously supply a constant current of a predetermined frequency to the feeder; and
    a plurality of transmission and receiving couplers each corresponding to a respective power supply device of the plurality of power supply devices, each transmission and receiving coupler including (i) a receiving coupler connected in series to the feeder and (ii) a transmission coupler connected to its corresponding power supply device, wherein:
- a circuit including the plurality of receiving couplers and the feeder is set to a series resonant frequency at the predetermined frequency,
- each circuit including one of the plurality of transmission couplers and a corresponding power line connecting the corresponding power supply device and the corresponding transmission coupler is set to have a series resonant frequency at the predetermined frequency,
- each of the plurality of power supply devices includes switching elements connected in a full bridge, and a diode connected to both ends of each switching element so that a current flows in a direction opposite to a direction of a current flowing through each switching element, and is configured so that each switching element is driven to convert a supplied DC current into the constant current of the predetermined frequency and output the current to the corresponding power line, and
- a priority order of stopping is set for the power supply devices, the power supply devices being selectively stopped on a decrease in power consumption of the load, a power supply device to be stopped is determined by the priority order, and among the switching elements, two switching elements connected to a positive side of the DC current are not driven, but two switching elements connected to a negative side of the DC current are driven in the power supply device to be stopped.

5. A non-contact power feeding apparatus comprising:
a feeder for supplying power to a load with varying power consumption in a non-contact manner;
a plurality of power supply devices that synchronously supply a constant current of a predetermined frequency to the feeder; and
a plurality of transmission and receiving couplers each corresponding to a respective power supply device of the plurality of power supply devices, each transmission and receiving coupler including (i) a receiving coupler connected in series to the feeder and (ii) a transmission coupler connected to its corresponding power supply device, wherein each transmission and receiving coupler includes a short circuit switch that electrically separates the power supply device corresponding to the corresponding transmission and receiving coupler from the feeder, wherein:
- a circuit including the plurality of receiving couplers and the feeder is set to have a series resonant frequency at the predetermined frequency,
- an impedance of each circuit including one of the plurality of transmission couplers and a corresponding power line connecting the corresponding power supply device and the corresponding transmission coupler is set to have a capacitive reactance corresponding to the predetermined frequency,
- each power supply device is configured so that an output voltage to be output to each circuit including the power line is controlled while the current flowing through the feeder is being fed back to output a constant current of the predetermined frequency to the feeder, and
- an order of stopping is set for the power supply devices, the power supply devices being selectively stopped depending on a decrease in power consumption of the load, a power supply device to be stopped is determined by the order, and the short circuit switch corresponding to the power supply device to be stopped is short-circuited to short circuit both ends of a coil, corresponding to a tertiary winding, that is wound around the corresponding transmission and receiving coupler, by which a magnetic path formed between the corresponding transmission coupler and the corresponding receiving coupler is interrupted.

* * * * *